US012650987B2

(12) United States Patent     (10) Patent No.:    US 12,650,987 B2

Ma et al.       (45) Date of Patent:    *Jun. 9, 2026

(54) LATE MATERIALIZATION OF QUERIED DATA IN DATABASE CACHE

(71) Applicant: Google LLC, Mountain View, CA (US)

(72) Inventors: Xiaobin Ma, Fremont, CA (US); Xun Cheng, Dublin, CA (US); Viral Shah, Cupertino, CA (US); Anjan Kumar Amirishetty, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/915,485

(22) Filed: Oct. 15, 2024

(65) Prior Publication Data

US 2025/0036625 A1     Jan. 30, 2025

Related U.S. Application Data

(63) Continuation of application No. 17/522,504, filed on Nov. 9, 2021, now Pat. No. 12,130,814.

(51) Int. Cl.
    *G06F 16/2453*      (2019.01)
    *G06F 16/2455*      (2019.01)

(52) U.S. Cl.
    CPC .. *G06F 16/24544* (2019.01); *G06F 16/24539* (2019.01); *G06F 16/24557* (2019.01); *G06F 16/2456* (2019.01)

(58) Field of Classification Search
    CPC ......... G06F 16/24544; G06F 16/24539; G06F 16/24557; G06F 16/2456; G06F 16/24552
    See application file for complete search history.

(56) References Cited

U.S. PATENT DOCUMENTS

| | | |
|---|---|---|
| 2004/0010488 A1 | 1/2004 | Chaudhuri et al. |
| 2010/0036805 A1* | 2/2010 | Blamer ............. G06F 16/24539 |
| | | 707/E17.014 |
| 2012/0150830 A1 | 6/2012 | Miyoshi |
| 2014/0310232 A1 | 10/2014 | Plattner et al. |
| 2014/0317084 A1 | 10/2014 | Chaudhry et al. |
| 2016/0006785 A1 | 1/2016 | Zhang et al. |

(Continued)

OTHER PUBLICATIONS

Rivenes, A., "Columnar Formats in Exadata Flash Cache", Oracle Database in-Memory, Oct. 30, 2017, retrieved from the internet <https://blogs.oracle.com/in-memory/post/columnar-formats-in-exadata-flash-cache>, 3 pages.

(Continued)

*Primary Examiner* — Khanh B Pham
*Assistant Examiner* — Kweku William Halm
(74) *Attorney, Agent, or Firm* — Lerner David LLP

(57) ABSTRACT

Aspects of the disclosure are directed to late materialization of attributes in response to queries to a database implementing a database cache. Queried data is materialized in temporary memory before the data is projected as part of generating a result to the query. Instead of materializing all of the attributes referenced in a query before executing the query, a database management system materializes attributes as "late" as possible—when the operation needing the attributes is executed. The operation needing the attributes can be performed sooner, as opposed to materializing all referenced attributes are materialized before executing the query.

20 Claims, 13 Drawing Sheets

(56) References Cited

U.S. PATENT DOCUMENTS

| | | | |
|---|---|---|---|
| 2016/0246718 A1 | 8/2016 | Slavicek et al. | |
| 2019/0121891 A1 | 4/2019 | Fender et al. | |
| 2022/0083552 A1 | 3/2022 | Gupta et al. | |
| 2022/0318481 A1 | 10/2022 | Save et al. | |

OTHER PUBLICATIONS

"Columnar and Row-Based Data Storage", SAP Help Portal, retrieved from the internet on Nov. 8, 2021<https://help.sap.com/viewer/6b94445c94ae495c83a19646e7c3fd56/2.0.01/en-US/bd2e9b88bb571014b5b7a628fca2a132.html>, 5 pages.

ABADI. Query Execution in Column-Oriented Database Systems. Feb. 29, 2008 (Feb. 29, 2008), Retrieved from the Internet: <http://cs-www.cs.yale.edu/homes/dna/papers/abadiphd.pdf>. 137 pages.

Anonymous. Query plan—Wikipedia, the free encyclopedia. Aug. 31, 2013 (Aug. 31, 2013), Retrieved from the Internet: <https://en.wikipedia.org/w/index.php?title=Query_plan&oldid=568323598>. 3 pages.

International Search Report and Written Opinion for International Application No. PCT/US2022/049235 dated Feb. 21, 2023. 14 pages.

International Preliminary Report on Patentability for International Application No. PCT/US2022/049235 dated May 23, 2024. 7 pages.

First Examination Report for Indian Patent Application No. 202447036626 dated Jul. 22, 2025. 7 pages.

* cited by examiner

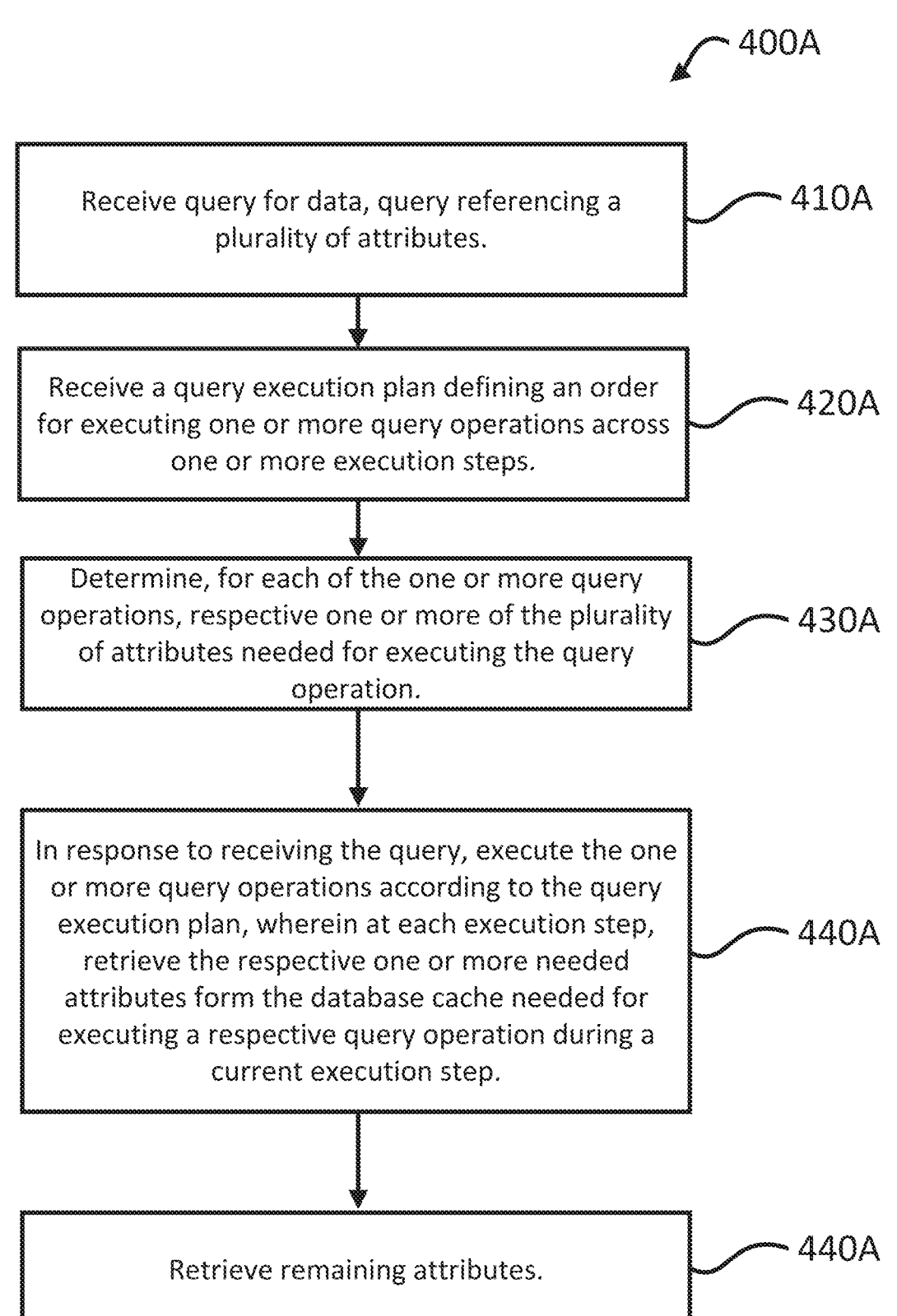

400A

Receive query for data, query referencing a plurality of attributes.          410A Receive a query execution plan defining an order for executing one or more query operations across one or more execution steps.          420A Determine, for each of the one or more query operations, respective one or more of the plurality of attributes needed for executing the query operation.          430A In response to receiving the query, execute the one or more query operations according to the query execution plan, wherein at each execution step, retrieve the respective one or more needed attributes form the database cache needed for executing a respective query operation during a current execution step.          440A Retrieve remaining attributes.          440A

Receive query execution plan.

410B

For each node in query execution plan, generate respective data structure representing attribute dependencies for each attribute referenced in the query.

420B

500A

Identify attributes specified in join condition. — 510A

Retrieve needed attritubes for performing join operation during an execution step specified by a query execution plan. — 520A Retrieve remaining attributes. — 530A

500C

While generating sorting data structure augment sorting data structure to include columnar unit index and row index for joined row specified in the query.

510C

While retrieving needed attributes represented in the sorting data structure, retrieve columnar unit index and row index for needed attribute.

520C

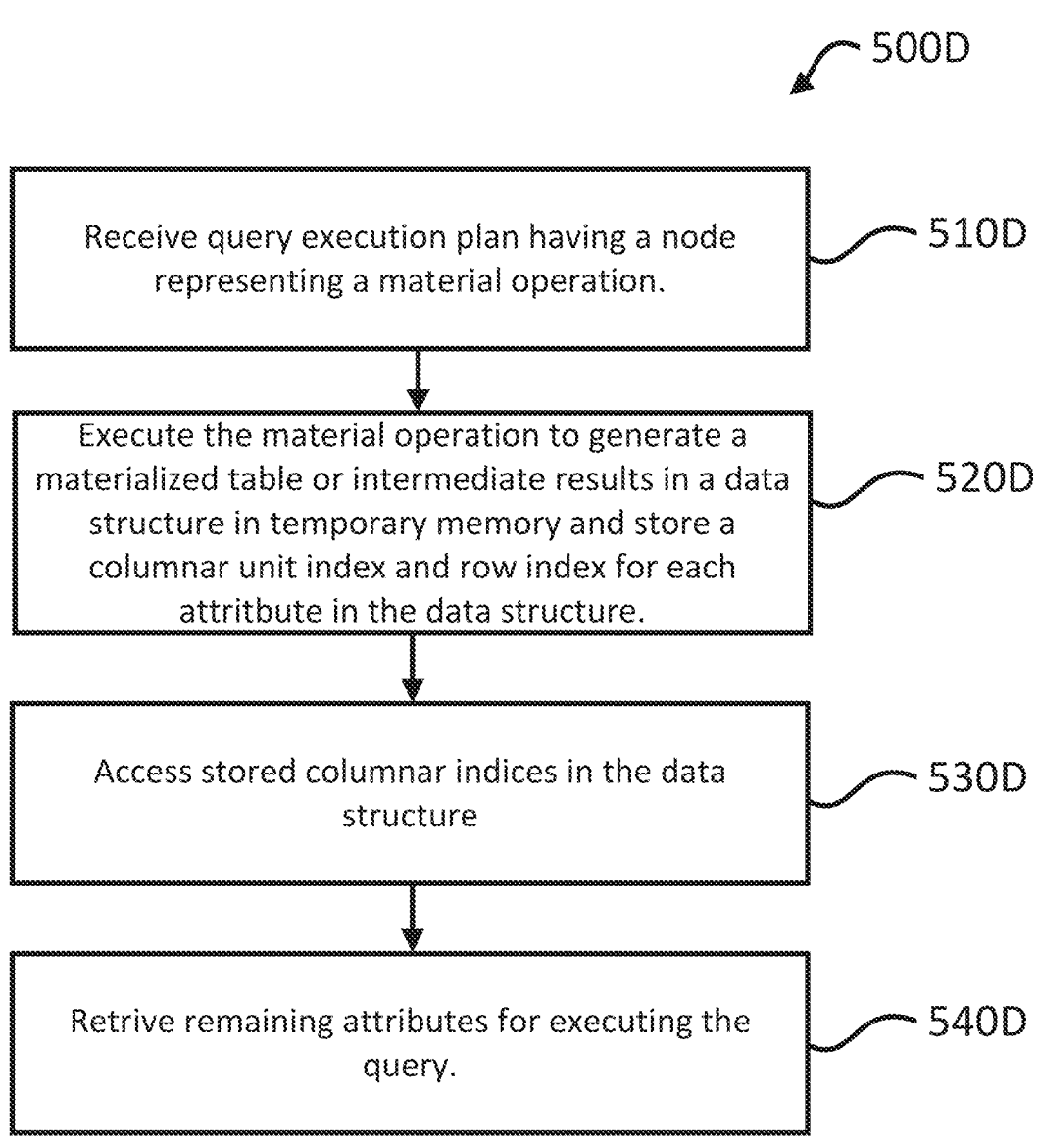

500D

Receive query execution plan having a node representing a material operation.    510D Execute the material operation to generate a materialized table or intermediate results in a data structure in temporary memory and store a columnar unit index and row index for each attritbute in the data structure.    520D Access stored columnar indices in the data structure    530D Retrive remaining attributes for executing the query.    540D

FIG. 5D

LATE MATERIALIZATION OF QUERIED DATA IN DATABASE CACHE

CROSS-REFERENCE TO RELATED APPLICATIONS

The present application is a continuation of U.S. patent application Ser. No. 17/522,504, filed Nov. 9, 2021, the disclosures of which is hereby incorporated herein by reference.

BACKGROUND

A database management system (DBMS) is a system that manages databases and handles receiving and resolving queries to the managed databases. A DBMS can manage tables, including the relations of data forming part of a database. The DBMS can read and write to individual rows or columns of the managed tables. In addition, the DBMS can update, delete, and add records to a managed database.

A DBMS can implement a cache for temporarily storing database data. The cache can store blocks of data representing rows of a base database table. Data in the cache can be stored in column-major or row-major format. Elements of a table stored in column-major format are stored contiguously in memory by column, while elements stored in row-major format are stored contiguously in memory by row.

SUMMARY

Aspects of the disclosure are directed to late materialization of queried data. Queried data is materialized in temporary memory before the data is projected as part of generating a response to a query received by a database management system. Instead of materializing all of the attributes referenced in a query before executing the query, a system as configured herein materializes attributes as "late" as possible—when the operation needing the attributes as input is executed. By materializing needed data for performing operations of a query first, aspects of the disclosure provide for more efficient query resolution over other approaches in which all data referenced in a query is materialized before a database management system executes the query. Query operations can be performed sooner by materializing only needed attributes before the rest of the attributes referenced in a query are materialized. Columnar caches storing column data that may be translated into row-major format when retrieved can be queried more efficiently by retrieving attributes for materialization only as needed for performing a current query operation in a query execution plan.

Aspects of the disclosure include a system including: one or more processors configured to: receive a query for data in a database comprising one or more tables, each table comprising one or more respective attributes, the query referencing a plurality of attributes; receive a query execution plan defining an order for executing the query by executing one or more query operations across one or more execution steps; determine, for each of the one or more query operations, respective one or more of the plurality of attributes needed for executing the query operation; and in response to receiving the query, execute the one or more query operations according to the query execution plan, wherein at each execution step of the query execution plan, the one or more processors are configured to retrieve the respective one or more needed attributes needed for executing a respective query operation during a current execution step from a database cache caching a plurality of attributes from the one or more tables.

A computer-implemented method, comprising: receiving, by one or more processors, a query for data of a database comprising one or more tables comprising one or more respective attributes; receiving, by the one or more processors, a query execution plan defining an order for executing the query by executing one or more query operations across one or more execution steps; determining, by the one or more processors and for each of the one or more query operations, respective one or more of the plurality of attributes needed for executing the query operation; and in response to receiving the query, executing, by the one or more processors, the one or more query operations according to the query execution plan, wherein at each execution step of the query execution plan, retrieving the respective one or more needed attributes needed for executing a respective query operation during a current execution step from a cache caching a plurality of attributes from the one or more tables.

Aspects of the disclosure provide for one or more non-transitory computer-readable storage media encoding instructions that when executed by one or more processors, cause the one or more processors to perform operations comprising: receiving, a query for data of a database comprising one or more tables, each table comprising one or more respective attributes, the query referencing a plurality of attribute, receiving a query execution plan defining an order for executing one or more query operations across one or more execution steps; determining, for each of the one or more query operations, respective one or more of the plurality of attributes needed for executing the query operation; and in response to receiving the query, executing the one or more query operations according to the query execution plan, wherein at each execution step of the query execution plan, retrieving the respective one or more needed attributes needed for executing a respective query operation during a current execution step from a cache caching a plurality of attributes from the one or more tables.

Aspects of the disclosure can include one or more of the following features. In some examples, aspects of the disclosure can include all of the features together, in combination.

In determining, for each of the one or more query operations, respective one or more of the plurality of attributes needed for executing the query operation, the one or more processors are configured to: determine one or more attributes specified as operands or conditions in the received query for executing the query operation.

The one or more query operations include one or more join operations for joining two or more tables according to a join condition; and wherein in determining, for each of the one or more query operations, respective one or more of the plurality of attributes needed for executing the query operation, the one or more processors are configured to determine that the two or more attributes according to the join condition are needed attributes for executing the join operation.

The cache is a columnar cache configured to cache attributes in one or more columnar units, each columnar unit corresponding to a respective columnar unit index and comprising one or more respective rows, each row corresponding to a respective row index within the columnar unit, and wherein the one or more processors are further configured to: store a respective columnar unit index and respective row index for each attribute referenced in the query; retrieve the one or more needed attributes using the stored respective columnar unit index and respective row index for each needed attribute; and after retrieving the one or more needed attributes, retrieve remaining attributes referenced in the query using the stored respective columnar unit index and respective row index for each remaining attribute.

In retrieving the remaining attributes, the one or more processors are configured to, for each execution step: determine, for the current execution step of the query execution plan, one or more attributes of the remaining attributes that are needed for executing a respective query operation during the current execution step; retrieve the one or more attributes of the remaining attributes that are needed for executing the respective query operation during the current execution step; and then retrieve the remaining attributes that are not needed for executing the respective query operation during the current execution step.

In retrieving the respective one or more needed attributes for the query operation from the cache, the one or more processors are further configured to retrieve the respective one or more needed attributes for the query operation only during the execution step of the query execution plan in which the query operation is executed by the one or more processors.

Wherein in retrieving the respective one or more needed attributes for the query operation from the cache, the one or more processors are further configured to: scan the cache to retrieve only the respective one or more needed attributes for the query operation only executed by the one or more processors during the current execution step; and after executing the query operation during the current execution step, execute a next query operation during a next execution step following the current execution step, wherein in executing the next query operation, the one or more processors are configured to scan attributes of the cache to retrieve only one or more needed attributes for executing the next query operation.

In determining, for each of the one or more query operations, respective one or more attributes of the plurality of attributes needed for executing the query operation, the one or more processors are configured to: generate a data structure representing attribute dependencies for each attribute referenced in the query, an attribute dependency for a first attribute comprising data representing zero or more child attributes that are respective result attributes of one or more query operations executed at respective earlier execution steps than an execution step for a query operation in which the first attribute is needed.

The one or more processors are further configured to: identify, from the data structure representing the attribute dependencies for each attribute, the zero or more child attributes for the first attribute; and retrieve the zero or more child attributes for the first attribute from the cache during an execution step in which the query operation needing the first attribute is executed.

In determining, for each of the one or more query operations, respective one or more of the plurality of attributes needed for executing the query operation comprises determining one or more attributes specified as operands or conditions in the received query for executing the query operation.

BRIEF DESCRIPTION OF THE DRAWINGS

FIG. 4A is a flowchart of an example process for performing late materialization of needed attributes for resolving a query.

FIG. 5D is a flowchart of an example process for storing cache indices of needed attributes during late materialization of a material operation.

DETAILED DESCRIPTION

Overview

Figure 1:
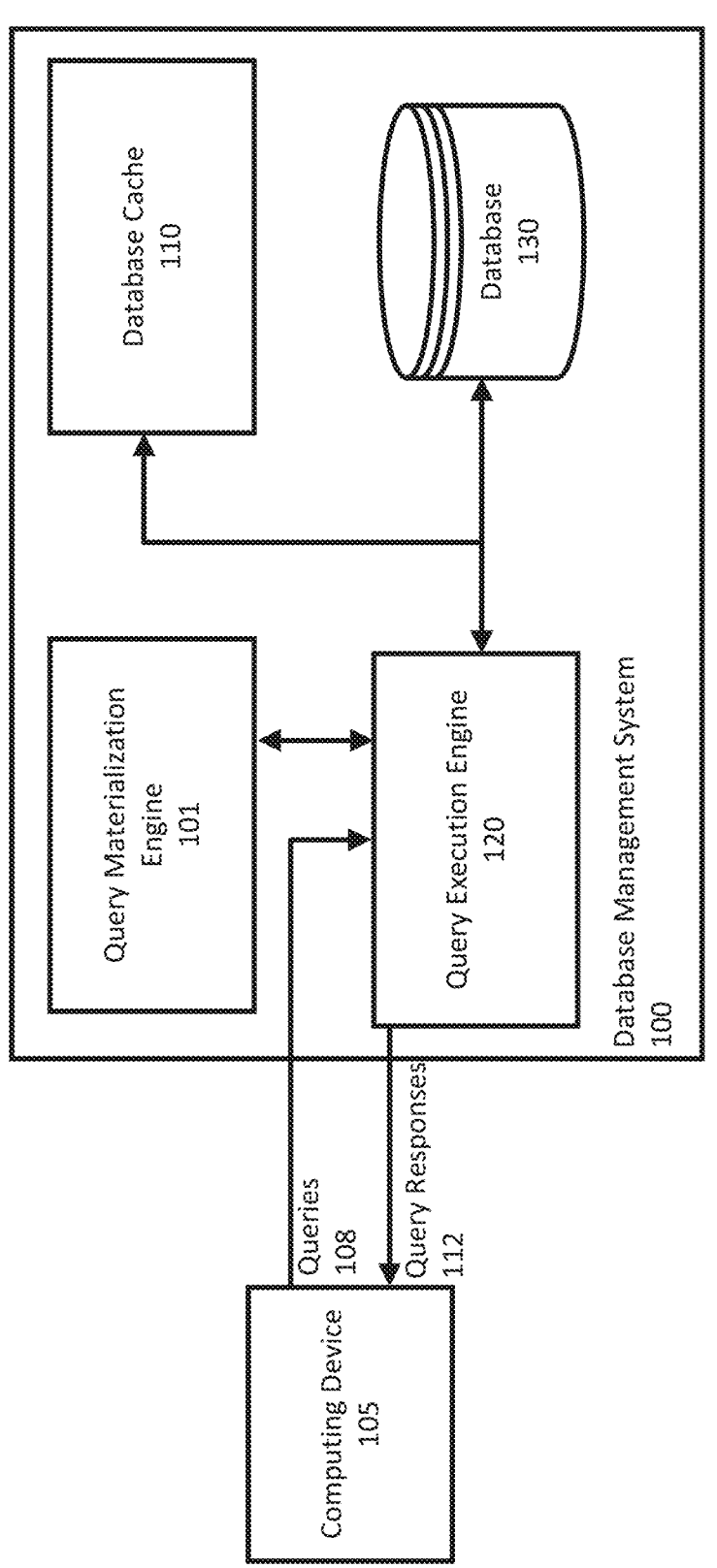
FIG. 1 is a block diagram of an example database management system (DBMS) configured for database cache late materialization, according to aspects of the disclosure.

Aspects of the disclosure are directed to late materialization of data during execution of queries to a database management system (DBMS) implementing a database cache. Queried data is materialized in temporary memory before the data is projected as part of generating a result to the query. The DBMS generates a query execution plan representing a number of query operations—which are operations performed by the DBMS as part of resolving a query. Query operations are performed at different execution steps specified in the query execution plan.

Instead of materializing all of the attributes referenced in a query before executing the query, a DBMS as configured herein materializes attributes as "late" as possible—when a query operation needing the attributes is performed. The query operation needing the attributes can be performed sooner, as opposed to conventional approaches in which all referenced attributes are materialized before executing a query execution plan to resolve a query.

Materialization refers to the storage of queried data in temporary memory, while the DBMS resolves a received query. Data can be materialized, for example, in main memory different from the database cache, and/or in permanent storage such as disk storage or a solid-state drive. An attribute can refer to a field or column of data within a queried table. A needed attribute is an attribute that is required for performing an operation at a particular execution step in executing a query.

During conventional query execution, a query is expressed as an execution plan of nodes representing query operations for performing the query and having attributes as input. The plan includes some nodes that are child nodes of other nodes, called parent nodes. The attributes specified in a child node are retrieved from a cache or other storage system, materialized in temporary memory, and projected before the operation represented by a parent node to the child is executed. For complex queries with nested operators, queries require materializing a large number of attributes before those attributes have been completely consumed during execution of the plan.

For a DBMS implementing a columnar cache in which a virtual horizontal partitioning of row-major data is translated into the physical column-major format before caching the data, the computational cost to translate the data back to row-major format when the data is projected is substantial. However, not all of the attributes referenced in a query are used in a given operation as part of executing a query. For example, not all columns referenced in a query are needed to perform a sort on a subset of columns specified in the query. As a result, the materialization and projection of these unneeded columns degrades the performance of the DBMS in resolving queries.

Aspects of the disclosure include identifying needed attributes for performing query operations and materializing only attributes from the cache corresponding to the needed attributes to perform a respective operation. Late materialization can be applied in a DBMS with a database cache, including a database cache configured for caching data in column-major format (also referred to as a columnar cache). Given the column-major format of a columnar cache, the DBMS can scan the columnar cache to retrieve the set of columns corresponding to the needed attributes identified in the query.

The DBMS passes, to an upstream query operation in a query execution plan, indices identifying the location of needed attributes for the upstream query operation in the columnar cache. The DBMS can materialize and project the needed attributes and send data to the upstream query operation, such as a database join, for consumption. After performing the operation, the DBMS can retrieve remaining columns as the query is executed.

Aspects of the disclosure provide for a number of technical advantages. By identifying the needed attributes to perform operations of a query, generating a result projection of queried column data is improved by not retrieving and materializing unused attributes. As a result, query performance of a DBMS can be improved, for example, in the amount of time necessary to resolve the query, and/or by the amount of memory required to materialize only needed attributes for executing the query.

In addition, performance can be further improved through the late materialization of columnar cache data. Accessing a columnar cache incurs additional computational costs due to the translation of virtual row-major representation to physical column-major representation of the cached columns before the cached data is retrieved. Reads and writes to and from disk or solid state can be reduced during query execution. Main memory usage can also be reduced by materializing only needed attributes into the main memory, identified as described herein.

Example Systems

FIG. 1 is a block diagram of an example database management system (DBMS) 100 configured for database cache late materialization, according to aspects of the disclosure. The DBMS 100 includes a query materialization engine 101, a database cache 110, a query execution engine 120, and a database 130.

The DBMS 100 is configured to receive queries, such as queries 108 from computing device 105, and resolve queries by providing responses, such as query responses 112. The DBMS 100 receives a query written in a language the DBMS is configured to process to execute a query. An example language is SQL. The language includes operators, which are keywords or phrases defined in the language and corresponding to certain operations that the DBMS is configured to perform. For example, the language may specify a JOIN operator for performing a table join for combining columns of selected tables to generate a new table. The columns may be specified by JOIN conditions, which the DBMS 100 is configured to identify in the query to perform the join in accordance with the conditions specified in the query.

A query response can include rows or columns—or portions of rows or columns—of tables of the database 130. Before providing the query response, the DBMS 100 can optionally process the data, for example, by sorting the rows of the response. Operations for processing the query response can be provided as part of a received query, and/or be part of a predetermined pipeline that the DBMS 100 is configured to execute as part of resolving a query.

The computing device 105 can be any of a variety of computing devices configured for querying a database. For example, the computing device 105 can be a personal laptop, a server, a wearable device, a sensor, etc. The computing device 105 can be user-operated and include peripherals or other components for receiving user input. In other examples, the computing device 105 is configured to automatically communicate with the DBMS 100, for example, as part of a computer program executed by the computing device 105.

In some examples, the DBMS 100 can be a hybrid transactional and analytical processing system (HTAP). An HTAP system is a database management system configured to perform both online transaction processing (OTAP) and online analytical processing (OLAP). OTAP systems are configured to coordinate and execute transactions between communicating computing devices. Transactions are recorded and updated in a corresponding database managed by an OTAP system. OLAP systems are configured to receive and resolve queries to a database used as part of analysis of data stored in the database. OLAP and OTAP systems are separately optimized for their respective use cases, with OLAP systems generally optimized for read-only access of data, and OTAP systems optimized for read and write access of queried data.

To improve the performance of query resolution, the DBMS 100 can implement the database cache 110. In some examples, the database cache 110 is a columnar cache. Queries to OLAP systems and HTAP systems supporting OLAP may include requests for data referenced by columns of tables in the database, as opposed to references to individual rows, which is more common in OTAP.

The DBMS 100 can be configured to reference and manipulate data in row-major format, but also implement a columnar cache storing column data in column-major format. Column-major formatted data can speed up the execution of some queries, for example, in systems in which columns of tables are queried more often than individual rows or records of tables.

Figure 2:
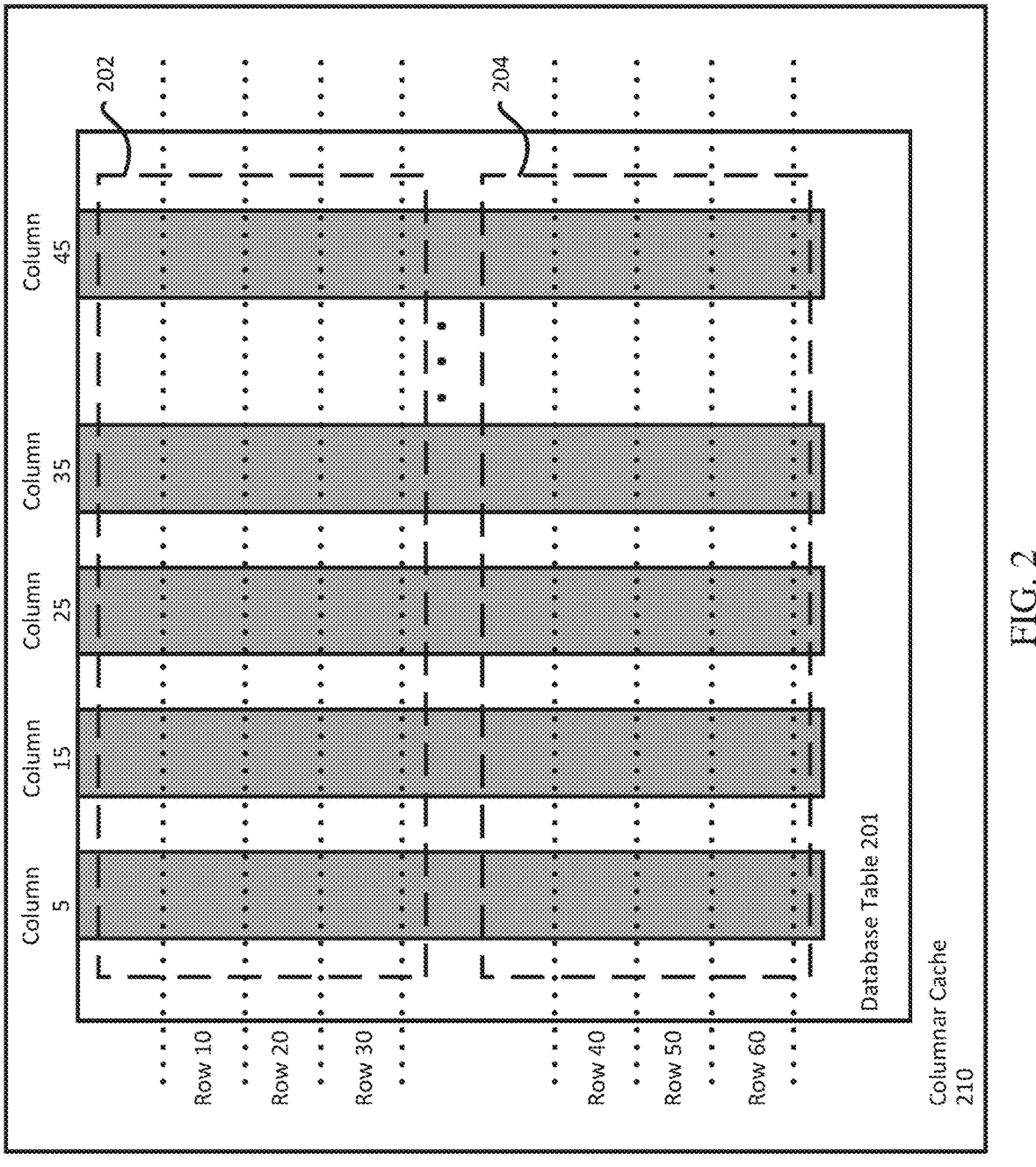
FIG. 2 is a block diagram of an example columnar cache 210 with cached data.

FIG. 2 is a block diagram of an example columnar cache 210 with cached data. In FIG. 2, the columnar cache 210 is shown as caching portions of a database table 201. Columns 5, 15, 25, 35, and 45 in the columnar cache 210 can be referenced using a respective columnar unit index and a row index.

Each columnar unit 202, 204 has a respective index. Within each columnar unit, each row of the columnar unit has a respective row index. For example, columnar unit 202 and columnar unit 204 have respective columnar unit indices, for example, 202 and 204. Each row, such as row 10, row 20, and row 30, of columnar unit 202 can be referenced according to a respective row index. Similarly, rows 40, 50, and 60 can be referenced according to a respective row index. The size of each columnar unit can be measured in blocks of data. The number of blocks for a columnar unit can vary from implementation-to-implementation.

The columnar cache 210 can include any of a variety of different types of memory devices used for caching data. For example, the columnar cache 210 can be cached in main memory, such as ram, and stored in column format. In addition, or alternatively, the columnar cache 210 stores the columnar data in permanent storage, such as solid-state or hard disk storage.

Returning to FIG. 1, the query execution engine 120 receives and parses a query to generate a query execution plan. The query execution plan represents query operations and an order in which the query operations are to be performed by the DBMS 100 to execute the query.

A query operation refers to an action performed by the DBMS 100 as part of executing or resolving the received query. A query operation can include reading or writing data from and to memory, performing arithmetic or logic calculations, performing a respective process for sorting, hashing, joining, and scanning data, etc. Each query operation of the execution plan is performed during an execution step. Query operations are performed at each execution step of the plan, from a start step to an end step. A query operation may have child operations, which are operations that the DBMS 100 must perform before the query operation—called the parent operation—is performed. Child operations can include child operations of their own.

The query execution plan can include a directed graph, such as a tree, of nodes representing different operations to be performed by the DBMS as part of executing the query. The directed graph can be an expression evaluation tree, representing more specific operators for executing one or more database operators of a query execution plan. For example, a query execution plan can be represented as a tree, with operators such as scan, join, or aggregation. An expression evaluation tree can contain more specific operators, such as addition, subtraction, multiplication, division, retrieval, cast, function, etc.

When represented as a tree, the root of the tree is stored because all operations in the tree are for evaluating the projection expression, for example t1.a+3, where t1.a is an attribute of a table. However, in some examples, the tree may be flattened as an array of sequential steps. An expression evaluation tree can be flattened as an ordered list that contains all the executable steps to evaluate the expression by the DBMS 100. As part of executing the query execution plan, when the DBMS encounters a qualified row, for example a row to be part of the output of a join operation, the DBMS scans for the remaining attributes, as described in more detail herein.

When represented as a tree, the root of the tree is stored because all operations in the tree are for evaluating the projection expression represented by the execution plan, for example t1.a+3, where t1.a is an attribute of a table. However, in some examples, the tree may be flattened as an array of sequential steps. This flattening may include all steps to evaluate the whole query that may contain more than one expression.

The DBMS 100 can generate a query execution plan according to any of a variety of different processes. As part of generating the query execution plan, the DBMS 100 can parse a received query and select corresponding query operations to execute according to the plan, based on a number of predetermined criteria. The predetermined criteria can be, for example, based on efficient use of compute or storage resources, number of operations to perform, total time to execute the query, user input specifying certain types of operations to perform, etc.

In some examples, the DBMS 100 can return a query execution plan as output, for example, when a received query includes operators for explaining how a query is executed. The query execution plan may be provided in response, as well as other metadata related to the execution of the received query.

Figure 3A:
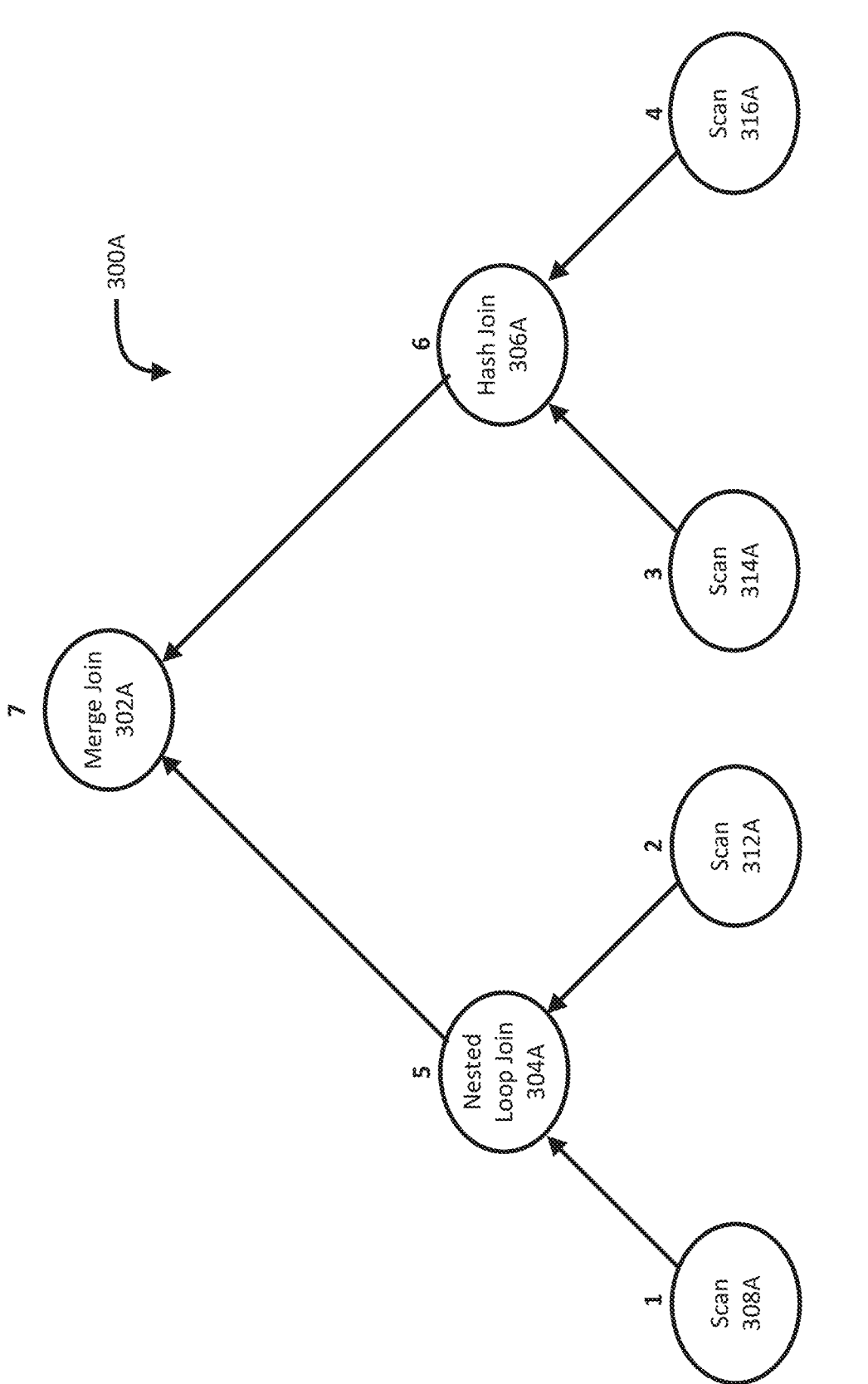
FIG. 3A illustrates an example query execution plan.

A query execution plan can be generated by the DBMS 100 or received from another computing device or component configured for generating a query execution plan. FIG. 3A illustrates an example query execution plan 300A. The query execution plan 300A is represented as a directed tree of nodes and links. Each node represents respective query operations, which can correspond to a respective operator of a received query. For example, the query execution plan 300A includes a merge join node 302A, a nested loop join node 304A, a hash join node 306A, and scan nodes 308A, 312A, 314A, and 316A.

The links are directed edges from child to parent nodes. Execution of a query execution plan can occur bottom-up when child nodes are leaves and the root is a parent node to all other child nodes. Attributes projected during the execution of a child query operation are passed upstream to its corresponding parent.

In the example query execution plan 300A, the scan operations represented by the scan nodes 308A and 312A must be performed before the operations of the nested loop join node 304A.

The DBMS 100 can perform any of a variety of different scans on the database cache 110 and/or tables of the database 130 as part of resolving a query. Example types of row store scans represented by the scan nodes 308A-316A include sequential scan, index scan, index-only scan, and bitmapping scan. A scan node can also represent scan operations for scanning the database cache 110.

Other types of nodes in the query execution plan can include join nodes, including nodes such as node 304A for nested loop joins, in which two sets of table data are joined using nested loops. Another example join is a hash join, represented by the hash join node 306A. In a hash join, sets of table data are joined using hash tables. Other types of join operators can be used as part of a query execution plan, and in general the DBMS 100 can generate a query execution plan with nodes representing any operator defined in the syntax of the query language used, such as SQL.

The query materialization engine 101 traverses the query execution plan for needed attributes for each query operation. Traversing refers to, for each node, identifying the needed attributes for performing a query operation represented by the node.

For example, a JOIN operator will have join conditions specifying the data to be joined in a result set. The query materialization engine 101 marks the attributes of the join conditions as needed for a join operation represented by its respective node in the plan. Before the current join operation is performed by the DBMS, the DBMS materializes and projects only the attributes specified in the join condition. During the traversal, information needed for retrieving and materializing the needed attributes are stored temporarily, as described herein. During query execution, the DBMS refers back to the information identified during traversal to retrieve and materialize first the needed attributes for performing a current operation in a query execution plan.

In FIG. 3A, each node 302-316A is performed at a respective execution step 1-7. For example, the operations represented by the scan node 308A are performed at execution step 1, the operations represented by the scan node 312A are performed at execution step 2, and so on.

The type and order of query operations performed at different execution steps can vary, for example, based on how the query execution plan 300A is generated. For example, DBMS 100 can generate a query execution plan to perform certain query operations based on an evaluation of what query operations, when executed, will cause the DBMS 100 to resolve the query faster or with fewer computational resources. The DBMS 100 or other component configured to generate the query execution plan can be configured to optimize a query execution plan for executing a query, according to predetermined criteria.

For example, if a received query specified joining subsets of two tables, the DBMS 100 may determine that a nested join loop is the most efficient join operation to perform to resolve the query. In other examples, a query received by the DBMS 100 can specify certain types of query operations to perform, such as a particular type of scan, as part of executing the query.

The operations of some nodes can be performed by the DBMS 100 in parallel, for example, the operations represented by the scan nodes 308-316A. However, operations represented by a parent node cannot be performed until the operations of its child nodes are performed. For example, operations represented by the node 304A for performing a nested loop join cannot be performed until the operations represented by the scan nodes 308A, 312A are performed.

For example, the query received by the DBMS 100 to generate the query execution plan 300A can be a query as shown in TABLE 1:

TABLE 1

| | |
|---|---|
| 1 | EXPLAIN (COSTS OFF) |
| 2 | SELECT o_orderpriority, l_shipdate, s_name |
| 3 | FROM lineitem, orders, supplier, customer |
| 4 | WHERE l_orderkey = o_orderkey and l_suppkey = s_suppkey and o_custkey = c_custkey and S_ACCTBAL = 100 and o_orderdate = date '1993-02-01' and c_name = 'Joe'; |

As shown in TABLE 1, three attributes are queried from four tables, a table of line items (lineitem), a table of orders (order), suppliers of the parts (suppliers), and a customer table (customers). The tables include attributes for an order priority (o_orderpriority in the orders table, for example "high," "medium," or "low" priority), a ship date (l_shipdate in the lineitem table, for example Jan. 1, 2021), and a supplier name (s_name in the supplier table, for example "Company X").

The query conditions the results to include only attributes in which: the lineitem and order keys match (l_orderkey=o_orderkey), the supplier key in the lineitem table and the supplier key in the supplier table match (l_suppkey-s_suppkey), the customer key from the order table and the customer key from the customer table match (o_custkey=c_custkey), the supplier account balance (S_ACCTBAL) is equal to 100, the order date (o_orderdate) is equal to "1993 Feb. 1" and the customer name (c_name) is equal to "Joe."

TABLE 2 shows example analysis or a detailed plan execution in response to the query from TABLE 1, from a database management system implementing late materialization. Details about the query execution plan 300A are provided in response to the EXPLAIN operator in line 1 of the query in TABLE 1.

TABLE 2

| | |
|---|---|
| 1 | Merge Join |
| 2 | Merge Cond: (orders.o_orderkey = lineitem.l_orderkey) |
| 3 | -> Sort |
| 4 | Sort Key: orders.o_orderkey = lineitem.l_orderkey |
| 5 | -> Nested Loop |
| 6 | Join Filter: (orders.o_custkey = customer.c_custkey) |
| 7 | -> Append |

TABLE 2-continued

| | |
|---|---|
| 8 | -> Customer Scan (columnar scan) on orders |
| 9 | Filter: (o_orderdate = '1993-02-01'::date) |
| 10 | CU quals: (o_orderdate = '1993-02-01'::date) |
| 11 | Columnar projection mode: late materialization |
| 12 | Columnar Cache Search mode: native |
| 13 | -> Seq Scan on orders |
| 14 | Filter: (o_orderdate = '1993-02-01'::date) |
| 15 | -> Append |
| 16 | -> Customer Scan (columnar scan) on customer |
| 17 | Filter: ((c_name)::text = 'Joe'::text |
| 18 | CU quals: ((c_name)::text = 'Joe'::text) |
| 19 | Columnar cache search mode: native |
| 20 | -> Seq Scan on customer |
| 21 | Filter: ((c_name)::text='Joe'::text |
| 22 | -> Sort |
| 23 | Sort Key: lineitem.l_orderkey |
| 24 | ->Hash Join |
| 25 | Hash Cond: (lineitem.l_suppkey = supplier.s_suppkey) |
| 26 | -> Append |
| 27 | -> Custom Scan (columnar scan) on lineitem |
| 28 | Columnar projection mode: late materialization |
| 29 | Columnar cache search mode: native |
| 30 | -> Seq Scan on lineitem |
| 31 | -> Hash |
| 32 | -> Append |
| 33 | -> Custom Scan (columnar scan) on supplier |
| 34 | Filter: (s_acctbal = '100'::numeric) |
| 35 | CU quals: (s_acctbal = '100'::numeric) |
| 36 | Columnar projection mode: late materialization |
| 37 | Columnar cache search mode: native |
| 38 | -> Seq Scan on supplier |
| 39 | Filter: (s_acctbal = '100'::numeric) |

The merge join node 302A corresponds to the query plan at lines 1 through 4 of TABLE 2. The nested loop join node 304A represents the operations at lines 5 through 6. The scan nodes 308A and 312A represent the operations at lines 7 through 14, 15 through 21. The hash join node 306A represents the operations at lines 24 through 25. The scan nodes 314A and 316A represent the operations at lines 26 through 30, 32 through 39. Note that the query execution plan as shown in TABLE 2 identifies the projection mode as late materialization, in lines 11, 28 and 36.

As part of determining the needed attributes for each operation, the query materialization engine 101 can generate a dependency mapping for on-demand late materialization. Late materialization is considered on-demand when the query materialization engine 101 can determine, at any execution step of the query execution plan, which attributes are necessary for materialization at the given execution step. In some examples, as described herein with respect to FIGS. 5A-5D, the DBMS 100 can perform late materialization without generating a dependency map, such as when a scan node immediately precedes a join node in a plan.

A dependency mapping is a data structure mapping dependencies from attributes referenced in the query to zero or more respective other attributes also referenced in the query. A first attribute is dependent on a second attribute if the second attribute must be materialized before the first attribute can be materialized. The second attribute may be an attribute to a child query operation of a parent operation that takes the first attribute as an input.

The dependency mapping can include a respective projection mapping data structure for a result attribute of an operation. The result attribute is the result of performing a query operation represented by a node in the query execution plan.

A projection mapping can store pointers to projection maps that correspond to child attributes to the result attribute for the projection mapping. The DBMS 100 identifies needed attributes, for example, by identifying operands or conditions for performing the given operator as specified in the received query. The projection mapping can store a pointer to arrays of attributes, called an attribute mapping. The dependency mapping can also store a respective flag for each attribute of each operator indicating whether the DBMS has already materialized the attribute during query execution.

The result attribute of a query operation is represented by a projection mapping that also includes an attribute mapping data structure. The attribute mapping stores respective start and end execution steps that define a range in which the attribute is needed for executing query operations as part of a query execution plan. An attribute is needed during the execution step in which a query operation receiving the attribute as an input operand or condition is executed. An attribute may also be needed if it is a child attribute to a parent attribute that is processed by a query operation at a later execution step.

Together, the projection mapping stores data identifying the child attributes of a given parent attribute, and the attribute mapping stores the execution steps for which the parent attribute is needed, as well as respective execution steps in which each of its child attributes are needed.

Figure 3B:
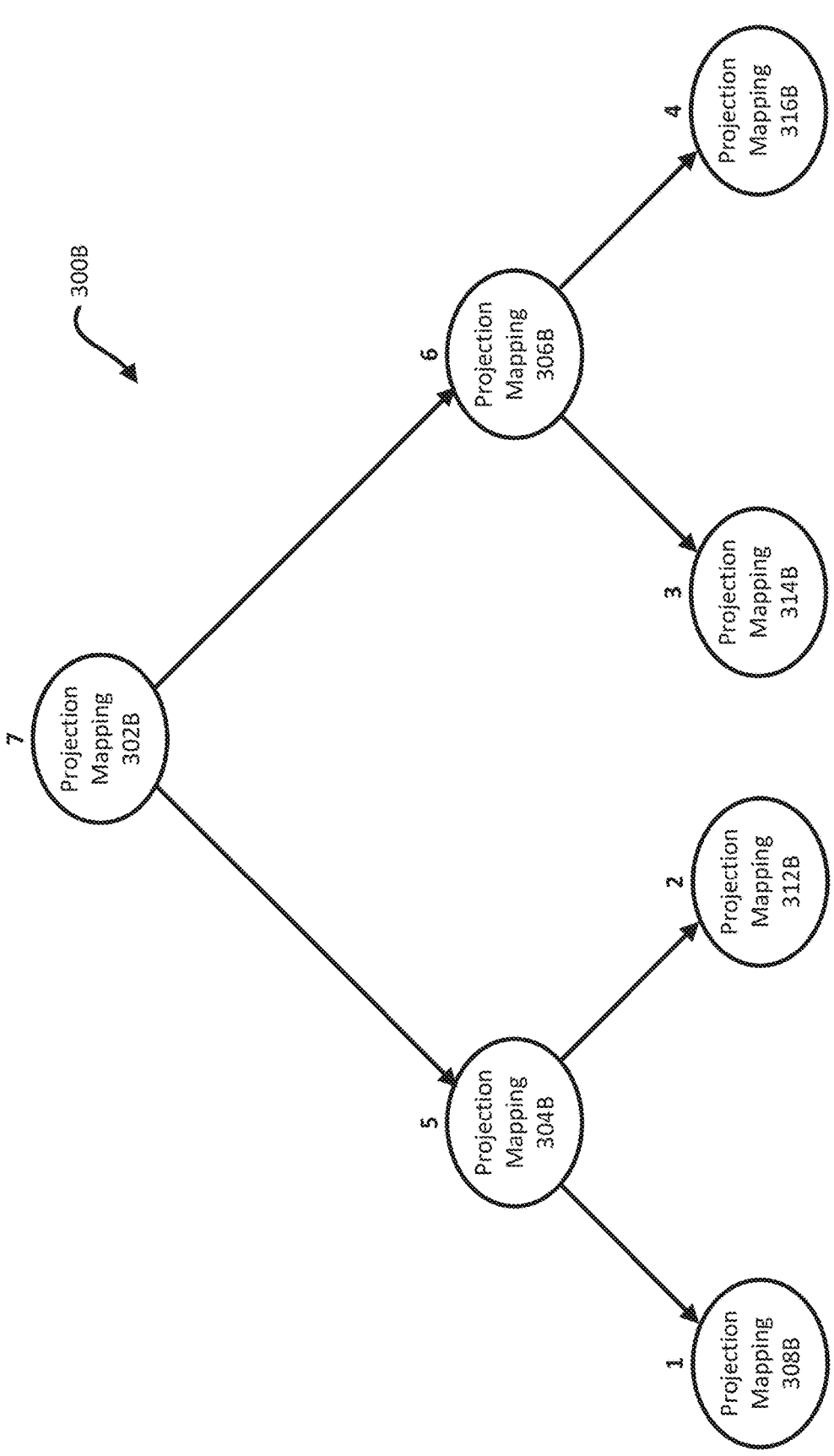
FIG. 3B illustrates an example dependency mapping for the example query execution plan.

FIG. 3B illustrates an example dependency mapping 300B for the example query execution plan 300A. Each projection mapping 302B, 304B, 306B, 308B, 312B, 314B, and 316B corresponds to a respective node in the query execution plan 300A. For example, projection mapping 308B is the projection mapping for node 308A, projection mapping 304B is the projection mapping for node 304A, and so on.

Directed links in the dependency mapping 300B correspond to memory pointers pointing to child projection maps from a parent projection mapping. For example, projection mapping 306B stores two memory pointers, one pointing to projection mapping 314B and another pointing to projection mapping 316B.

TABLE 3 shows an example definition of a projection mapping.

TABLE 3

| | |
|---|---|
| 1 | struct ProjectionMapping { |
| 2 | PlanState *parent |
| 3 | ProjectionMapping *inner_proj_mapping; |
| 4 | ProjectionMapping *outer_proj_mapping |
| 5 | AttributesMapping *attr_mapping; |
| 6 | }; |

Line 2 declares a node from the query execution plan corresponding to the defined projection mapping. Lines 3 and 4 declare pointers for child projection maps for the child nodes of the parent node in the query execution plan. "Inner" and "outer" projection maps refer to respective one of two child nodes that a corresponding parent node in the query execution plan may have. In some examples, nodes in the query execution plan may have more than two child nodes, or no child nodes at all. In those examples, the projection mapping data structure may be defined to hold pointers for a respective projection mapping for each child node. In other examples, a projection mapping may have only one child node. Line 5 declares a pointer to an attribute mapping for the attribute corresponding to the projection mapping.

Figure 3C:
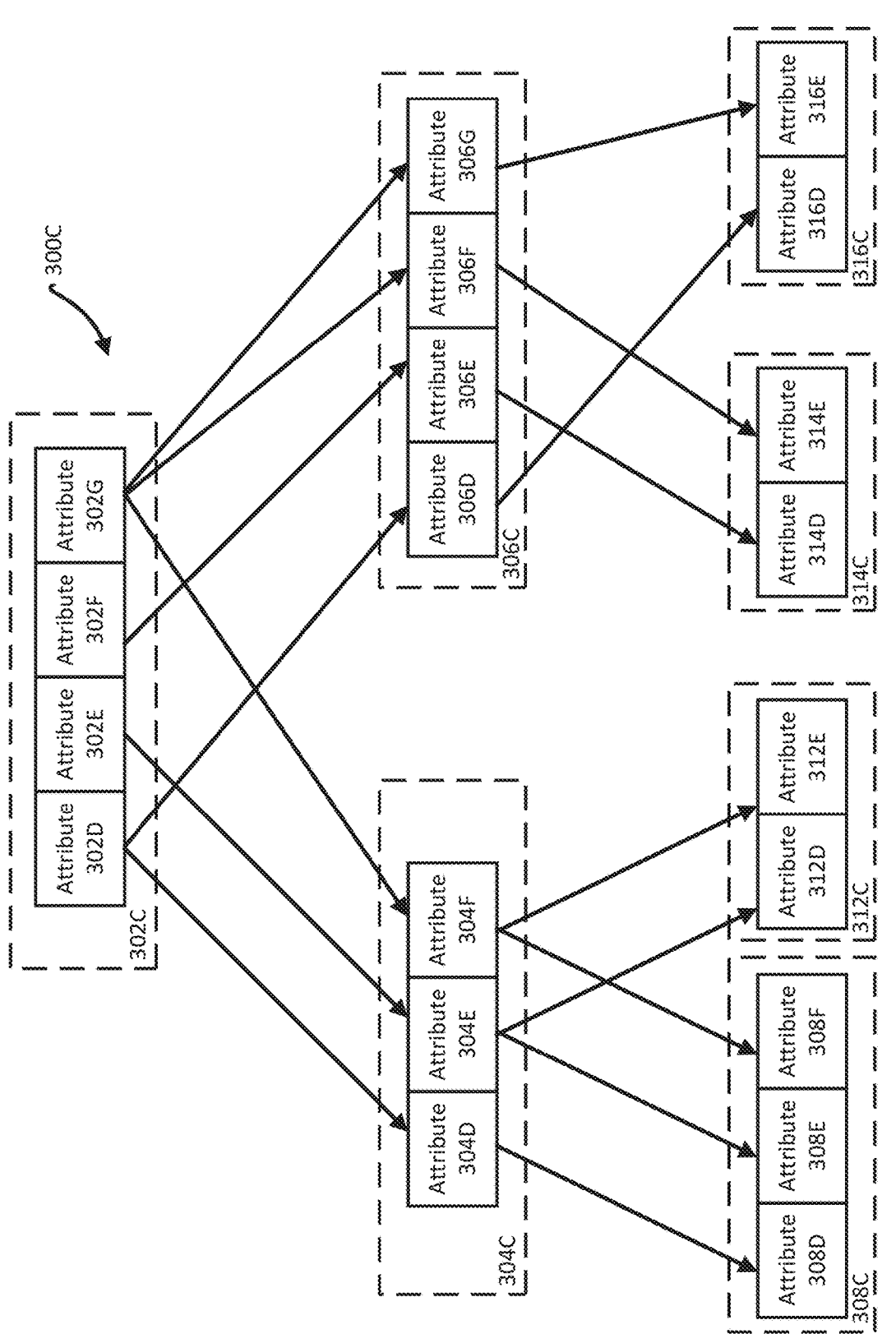
FIG. 3C illustrates an example attribute mapping for the example dependency mapping.

FIG. 3C illustrates an example attribute mapping 300C for the example dependency mapping 300B. Attribute maps 302C, 304C, 306C, 308C, 312C, 314C, and 316C include respective attributes 302D-G. 304D-F, 306D-G, 308D-F, 312D-E, 314D-E, and 316D-F, and are shown in FIG. 3C as dashed boxes.

Directed links in FIG. 3C illustrate how attributes represented in each attribute mapping are mapped to child attributes. For example, attribute mapping 302C stores pointers to child attributes for attributes 302D-G. Attribute 302D has two child attributes, represented by pointers to attribute 304D in attribute mapping 304C, and attribute 306D in attribute mapping 306C.

To materialize attribute 302D, attributes 304D and 306D must be materialized by the DBMS. However, as shown in FIG. C, attributes 304D and 306D have child attributes of their own. Attribute 308D is the child attribute of attribute 304D, and attribute 316D is the child attribute of 306D. Therefore, to materialize attribute 302D, when attribute 302D is a needed attribute, attributes 304D, 306D, 308D, and 316D must also be materialized.

TABLE 4 shows an example definition of an attribute mapping.

TABLE 4

| | |
|---|---|
| 1 | struct AttributesMapping { |
| 2 | int start_step; |
| 3 | int end_step; |
| 4 | std::vector<int> *inner_attrs; |
| 5 | std::vector<int> *outer_attrs; |
| 6 | }; |

Line 2 and line 3 declare integer variables storing start and end steps, respectively, for defining a range of execution steps in which the attribute represented by the attribute mapping is needed. Lines 4 and 5 define vectors storing pointers for attribute maps of child attributes to the attribute represented by the attribute mapping. In some examples, child attributes are referred to as inner or outer children.

The query materialization engine 101 traverses the query execution plan node by node to generate a dependency mapping. To retrieve an attribute of a parent, the query materialization engine 101 requires retrieving attributes of its children. Whenever an attribute is needed, the DBMS 100 projects the attribute by recursively projecting all the child attributes marked as needed in the projection mapping of the current attribute.

The query materialization engine 101 traverses the dependency mapping while executing operations in the query execution plan. For each query operation encountered, the query materialization engine 101 checks the dependency mapping and identifies what, if any, child attributes need to be materialized before materializing the needed attributes for the query operation of a current execution step.

The query materialization engine 101 updates a flag for each attribute after materializing the attribute. In this way, the query materialization engine 101 only performs materialization of a given attribute once, which can further improve performance during query execution, for example, when two parent attributes share a common child attribute. If the attribute is needed and has not yet been retrieved and materialized, the query materialization engine 101 retrieves the child attributes, performing recursive calls as necessary, for example, if the child attributes have their own child attributes. The query materialization engine 101 can store the flags for each attribute in a data structure for storing the materialized attributes in memory. For example, the attributes can be stored in a slot data structure, such as a TupleTableSlot in PostgresSQL.

Example Methods

FIG. 4A is a flowchart of an example process 400A for performing late materialization of needed attributes for resolving a query.

The DBMS receives a query for data in the database, the query referencing a plurality of attributes, according to block 410A.

The DBMS receives a query execution plan defining an order for executing query operations across one or more execution steps, according to block 420A. The DBMS can generate the query execution plan, or in some examples, receive the query execution plan from another computing device configured to generate a query execution plan.

The DBMS determines, for each of the query operations, respective attributes needed for executing the query operation, according to block 430A. With reference to FIGS. 1-3C, the DBMS can traverse the query execution plan and determine needed attributes, for example, based on operands or conditions specified in the query for performing an operation in the plan.

The DBMS, in response to receiving the query, executes the query operations according to the query execution plan, according to block 440A. At each execution step of the query execution plan, the DBMS retrieves the respective needed attributes from memory or persistent storage needed for executing a respective query operation during a current execution step.

To retrieve the needed attributes from a columnar cache, the DBMS can store a respective columnar unit index and respective row index for each attribute referenced in the query.

While executing the query according to the plan, the DBMS can retrieve the needed attributes using the stored columnar unit index and row index for each needed attribute. After retrieving the needed attributes, the DBMS retrieves the remaining attributes using the stored respective columnar unit index and respective row index for each remaining attribute.

As part of retrieving the needed attributes, the DBMS can scan attributes of the database cache to retrieve only the respective needed attributes for the query. After executing the query operation during a current execution step, the DBMS can execute a next query operation during a next execution step following the current execution step. Executing the next execution step can include scanning attributes of the database cache to retrieve only needed attributes for executing the next query operation.

The DBMS retrieves the remaining attributes, according to block 440A. As part of retrieving the remaining attributes, the DBMS can determine, for a current execution step of the query execution plan, attributes of the remaining attributes that are needed for executing a respective query operation during the current execution step. The DBMS can retrieve the attributes of the remaining attributes that are needed for executing the respective query operation during the current execution step. Then, the DBMS can retrieve the remaining attributes that are not needed for executing the respective query operation during the current execution step.

Figure 4B:
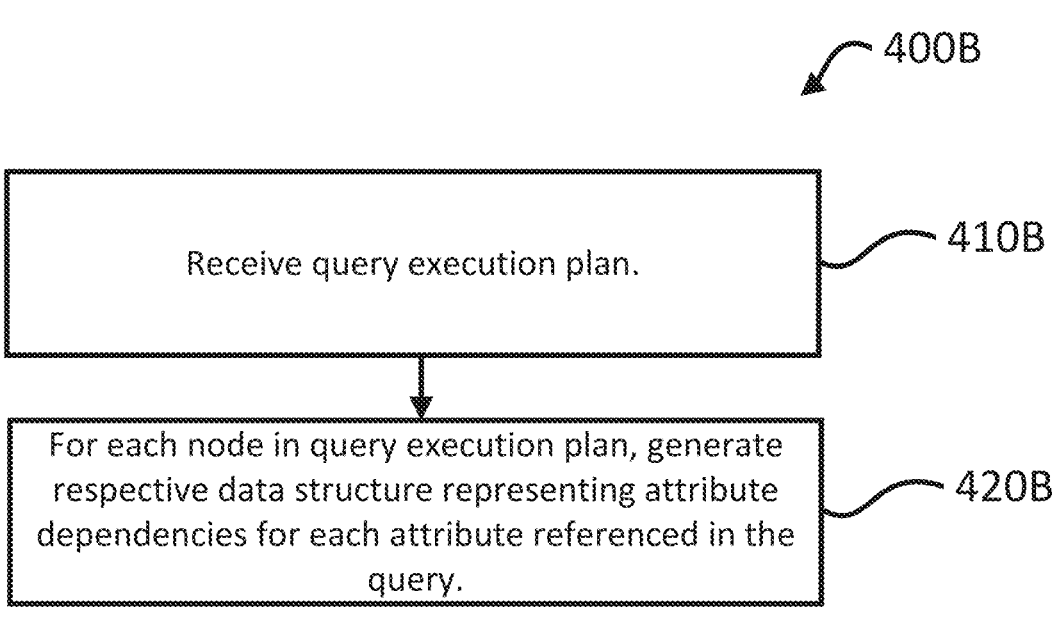
FIG. 4B is a flowchart of an example process for generating a dependency mapping for performing late materialization.

FIG. 4B is a flowchart of an example process 400B for generating a dependency mapping for performing late materialization.

The DBMS receives a query execution plan for executing a query, according to block 410B.

For each node in the query execution plan, the DBMS generates a respective data structure representing attribute dependencies for each attribute referenced in the query, according to block 420B.

The attribute dependency for a first attribute has data representing zero or more attributes. The zero or more attributes are respective result attributes of query operations executed at respective earlier execution steps than an execution step for a query operation in which the first attribute is needed. The respective data structure can be a projection mapping for the result attribute of a respective node in the query execution plan. Attribute dependencies can be stored as attribute maps within a projection mapping.

Figure 4C:
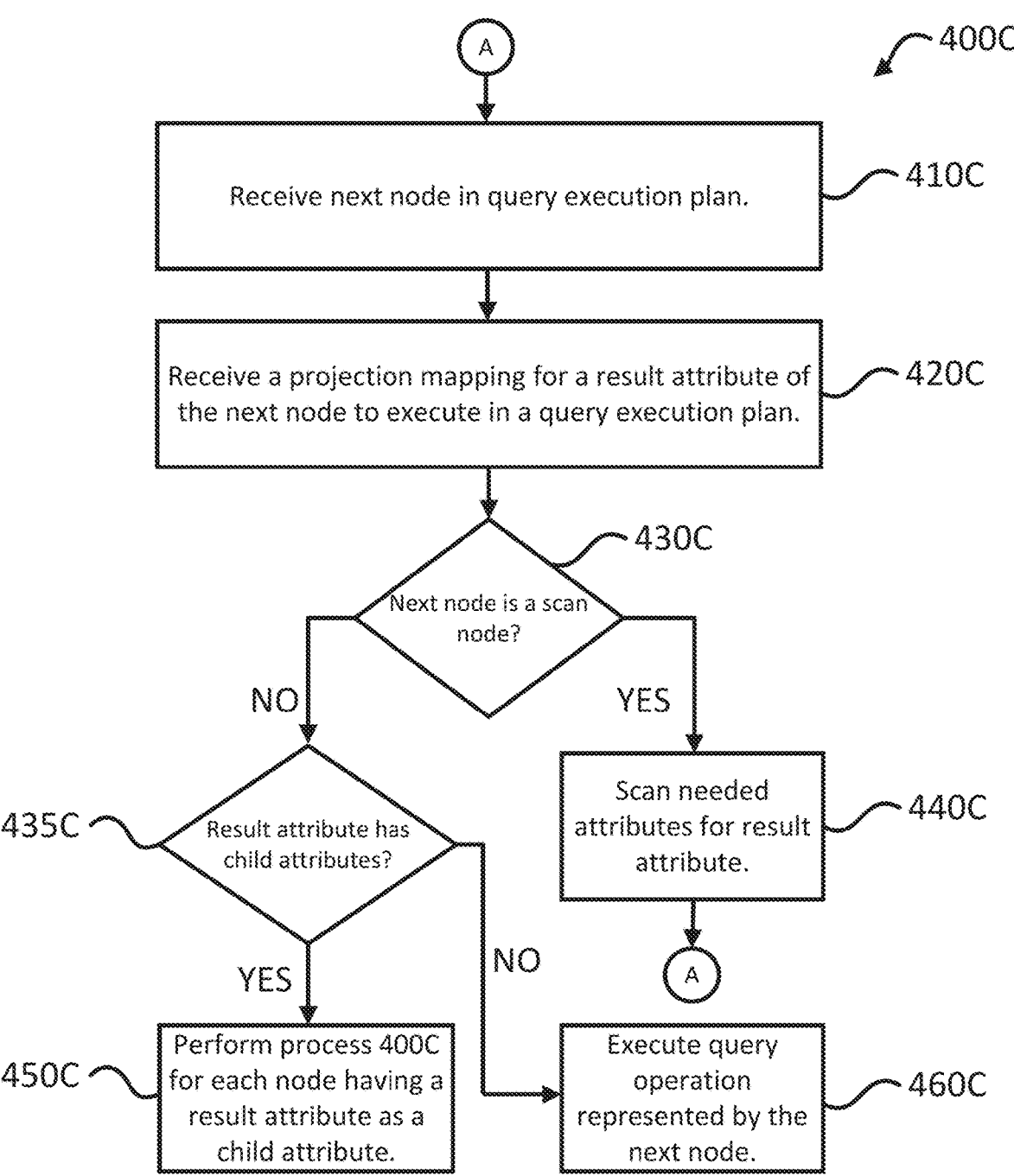
FIG. 4C is a flowchart of an example recursive process for performing late materialization of needed attributes in resolving a query.

FIG. 4C is a flowchart of an example recursive process 400C for performing late materialization of needed attributes in resolving a query.

The DBMS receives the next node in a query execution plan, according to block 410C. The DBMS receives nodes of a plan in order of their execution step.

The DBMS receives a projection mapping for a result attribute of the next node to execute in a query execution plan, according to block 420C. As described herein, the DBMS can generate a dependency map, including a respective projection mapping for each result attribute of each node in a query execution plan.

The DBMS determines whether the next node is a scan node, according to decision diamond 430C. If the next node is a scan node ("YES"), then the DBMS performs the query scan corresponding to the next node, according to block 440C. The DBMS then receives the next node in the query execution plan, according to block 410C (shown through marker A in FIG. 4C). A scan node will not have child nodes, by definition.

If the next node is determined not to be a scan node ("NO"), then the DBMS determines whether the result attribute of the next node has child attributes, according to decision diamond 435C. If the result attribute has child attributes ("YES"), then the DBMS recursively performs the process 400C for each node having a result attribute as a child attribute, according to block 450C. For example, if the result attribute has two child attributes that are result attributes of nodes 1 and 2, respectively, then at decision diamond 435C, the DBMS recursively performs the process 400C twice, one call for node 1, and another call for node 2. If the result attributes for nodes 1 and 2 have child attributes of their own, the DBMS performs additional recursive calls until reaching an attribute with no children.

If the result attribute does not have child attributes ("NO"), then the DBMS executes a query operation represented by the next node, according to block 460C. By block 460C, the needed attributes for executing the query operation to generate the result attribute for the next node have been retrieved.

TABLE 5 shows an example pseudocode implementation of the process 400C of FIG. 4C.

TABLE 5

```
1    void retrieveAnAttr(ProjectionMapping *proj_mapping,
        int attnum) {
2    PlanState *node = proj_mapping->parent;
3    if (isColumnarScan(node)) {
4        int row_index = GetRowIndex(node);
5        for (int attr : *project_mapping->
                attr_mapping[attnum]->
                inner_attrs) {
6            RetrieveAttrFromColumnarCache(node, attr,
                        row_index);
7        }
8        return;
9    }
10
11   if(!proj_mapping->mapping[attnum]->inner_attrs-
        >empty( )){
12       for (int attr:*proj_mapping->
                attr_mapping[attnum]->
                inner_attrs) {
13           retrieveAnAttr(proj_mapping->
                    inner_proj_mapping,
                    attr);
14       }
15   }
16
17   if(!proj_mapping->mapping[attnum]->outer_attrs->empty( )){
```

17

TABLE 5-continued

```
18      for (int attr:*proj_mapping->
                attr_mapping[attnum]->
                    outer_attrs) {
19          retrieveAnAttr(proj_mapping->
                    outer_proj_mapping,
                    attr);
20      }
21      }
22
23      ExecInterpExpr(getExprEvalState(proj_mapping),
        getExprEvalContext(proj_mapping),
        Attnum);
```

The function is called receiveAnAttr and takes two input parameters: a pointer to a projection mapping called proj_mapping, and an integer attribute number called attnum. received An Attr does not explicitly return a value, but when executed by the DBMS, causes the DBMS to retrieve the needed attributes for a result attribute corresponding to an input projection mapping. The projection mapping is the projection mapping of the result attribute for which the DBMS is retrieving when the function retrieveAnAttr is called. The attribute number is an index for a child attribute of the result attribute corresponding to the projection mapping. retrieveAnAttr can be invoked as part of a loop or larger function which retrieves each child attribute for a result attribute.

Line 2 declares and initializes a query execution plan node, referenced by the pointer node. node is set to the query execution plan node corresponding to the result attribute of the input projection mapping.

Lines 3-9 handle the case in which the node of the result attribute represented by the input projection mapping is a scan node. Line 3 checks if the node is a columnar scan node, although line 3 could be modified to check for any of a variety of different types of scans. In line 4, the row index row_index is retrieved from the scan node, indicating from which row index of a cached attribute is to be retrieved.

Lines 5 and 6 are instructions for performing a loop over each needed attribute for the attribute indexed at attnum, by retrieving each needed attribute from the columnar cache at the specified row_index. Needed attributes for performing the scan are stored in the array of inner_attrs within the attribute mapping for the input projection mapping.

Lines 11-15 implement the recursive functionality of attribute retrieval with late materialization. Line 11 checks to see if the attribute at at tnum has child attributes of its own. If so, the DBMS executing retrieveAnAttr proceeds to the loop in lines 12-13. The loop instructs the DBMS to recursively call retrieveAnAttr for each of the inner child attributes of the result attribute (following the example definition for projection mapping as shown in TABLE 3). Lines 17-21 similarly implement the recursive functionality, but for retrieving the outer child attributes of the result attribute.

Line 23 represents an example call for evaluating the query operation of the node for the projection mapping invoked as an input parameter in the current call in a stack of recursive calls generated by executing retrieveAnAttr.

Late Materialization—Scan Before Join

In some examples, generating a dependency mapping for late materialization is not needed. One example is when a query execution plan includes a scan before a join node. For on-demand late materialization, a flag is used to indicate whether an attribute has been retrieved or not. For the case of a scan operation before a join operation, there is no need for the flag, because before the join only needed attributes are available, and after the join all attributes are available.

Figure 5A:
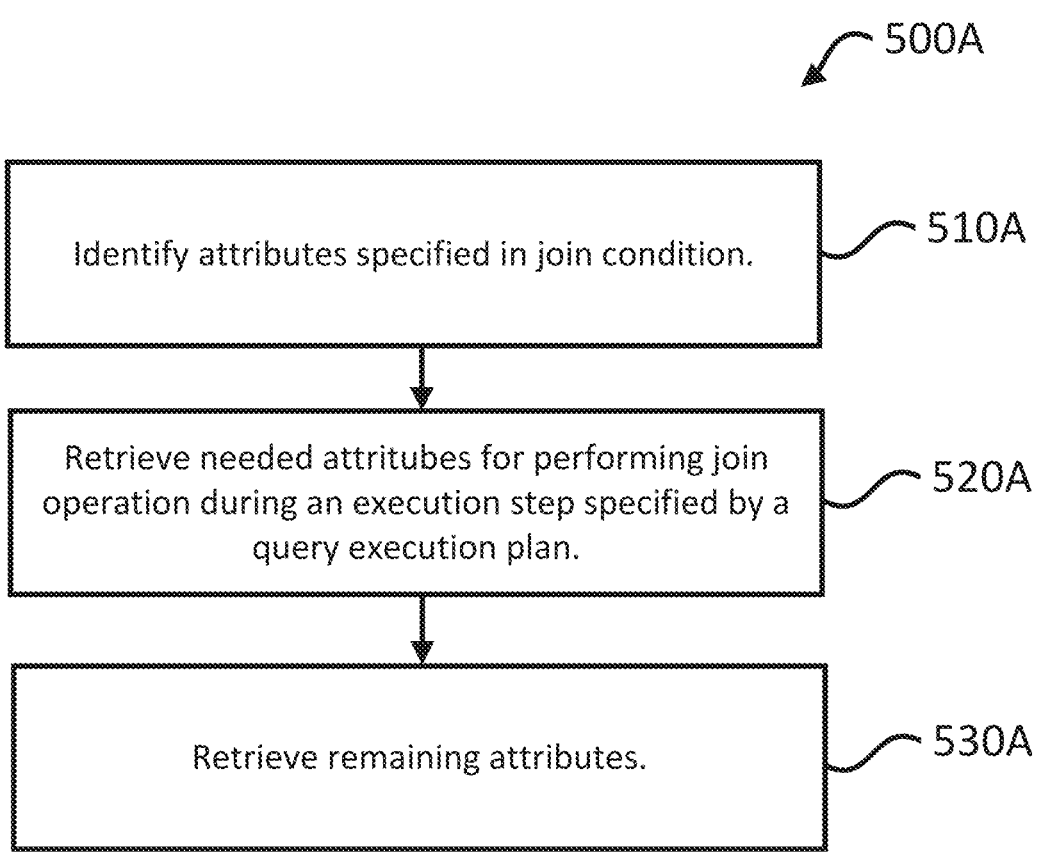
FIG. 5A is a flowchart of an example process for late materialization of needed attributes for a join operation before a scan for a query execution plan.
Figure 5B:
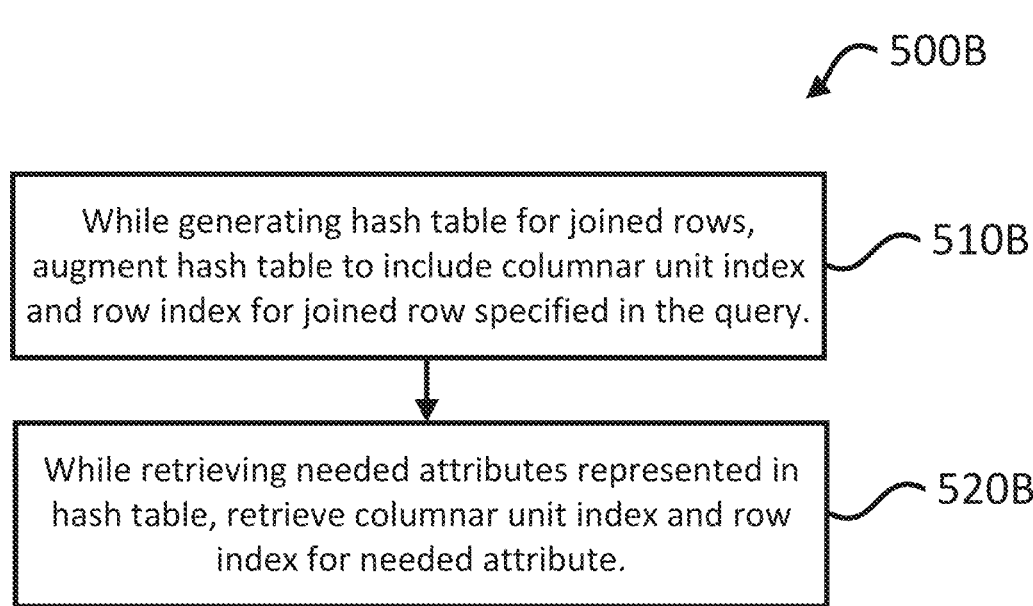
FIG. 5B is a flowchart of an example process for generating a hash table during late materialization of needed attributes for a hash join operation of a query execution plan.
Figure 5C:
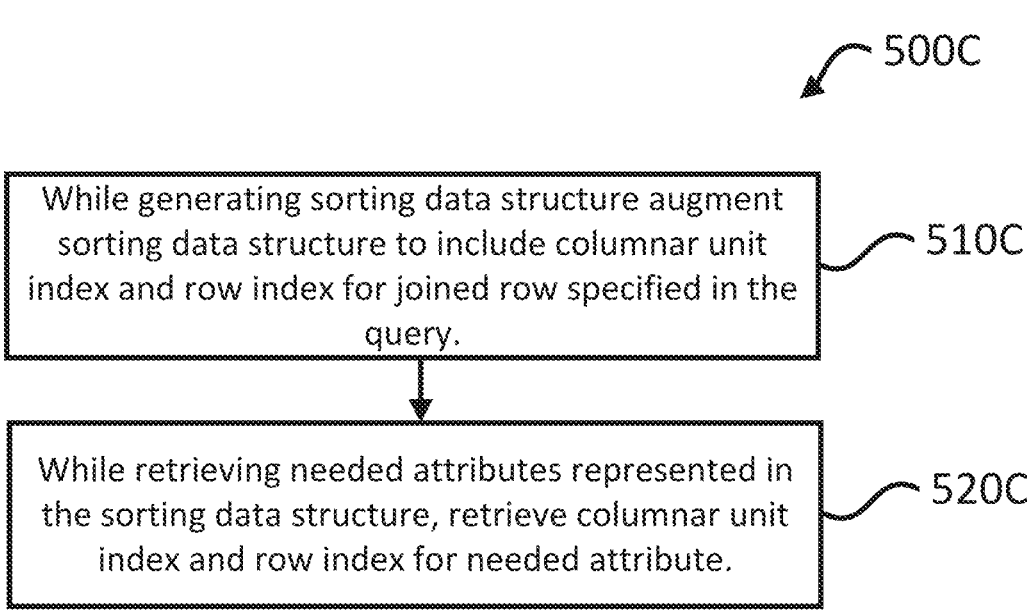
FIG. 5C is a flowchart of an example process for generating a sorting data structure during late materialization of needed attributes of a join operation.

FIGS. 5A-D are example processes performed during late materialization of join operations under certain scenarios. FIG. 5A shows a process for late materialization for a join operation before a scan operation. FIG. 5B shows a process for late materialization for a hash join operation. FIG. 5C shows a process for late materialization when performing a join operation requiring table data to be sorted. FIG. 5D shows a process for storing columnar cache indices for late materialization of a material operation.

FIG. 5A is a flowchart of an example process 500A for late materialization of needed attributes for a join operation before a scan for a query execution plan. For example, if the query execution plan generated by the DBMS includes join nodes as parent to scan nodes, the DBMS can perform the process 500A for late materialization during the execution step in which the join operation is performed.

The DBMS processes the join conditions for the JOIN operator, identifying attributes specified in the join conditions that are needed, according to block 510A.

The DBMS retrieves needed attributes for performing the join operation during an execution step specified by a query execution plan, according to block 520A. When the DBMS executes the JOIN operator and retrieves the needed attributes from the result set of the query, the original attribute numbers from the base table are retrieved from the mapping to retrieve the correct columns in the columnar cache.

For example, the DBMS performs a columnar cache scan and retrieves the columns corresponding to the needed attributes and transfers the needed attributes to the JOIN operator, along with the columnar unit number and the row index within the columnar unit where the needed attributes are located in the cache.

The DBMS retrieves the remaining attributes, after evaluating the join conditions for the JOIN operator, according to block 530A. As part of retrieving the remaining attributes, the DBMS can perform late materialization as described herein to determine which of the remaining attributes are needed at a later execution step and retrieve and materialize those attributes first. For example, the DBMS may perform the process 400C according to FIG. 4C.

Late Materialization—Hash Join

In some examples, the DBMS is configured to perform hash join operations. In a hash join operation, the DBMS can generate a hash table of rows of attributes specified in a join. A hash join is a blocking operation. A blocking operation is an operation performed by the DBMS in which all rows of an input to the blocking operation are consumed before a single row is produced, as output. Aspects of the disclosure provide for improving performance speed of executing a hash join by late materialization.

FIG. 5B is a flowchart of an example process 500B for generating a hash table during late materialization of needed attributes for a hash join operation of a query execution plan. The DBMS, as part of generating a hash table for the joined rows, augments the hash table to include the columnar unit index and row index for each of the joined rows specified in the query, according to block 510B.

The hash table is populated with needed attributes for performing the hash join. While retrieving needed attributes represented in the hash table, the DBMS retrieves a columnar unit index and row index for the needed attributes, according to block 520B.

Late Materialization—Sorting Before Joining

In some examples, the DBMS is configured to sort two or more attributes, as part of executing a query. Sorting is necessary for certain types of joins, such as a merge join.

The DBMS can implement any of a variety of different sorting processes and generate a sorting table that also includes the columnar unit and row indices of the columns of the needed attributes in the cache. Because the DBMS retrieves only the needed attributes, the resulting sorting data structure is smaller and therefore more computationally efficient to sort.

FIG. 5C is a flowchart of an example process 500C for generating a sorting data structure during late materialization of needed attributes of a join operation. The DBMS, as part of generating a sorted data structure for the joined rows, augments the sorted data structure to include the columnar unit index and row index for each of the joined rows specified in the query for sorting, according to block 510C. The sorting operation can be any of a variety of different in-memory sorting processes, such as merge sort.

The sorting data structure is populated with needed attributes for performing the sorting operation. While retrieving needed attributes represented in the sorting data structure, the DBMS retrieves the columnar unit index and the row index of the needed attribute, according to block 520C.

Late Materialization—Material Operators

In some examples, a query execution plan received by the DBMS may include nodes representing material operations. When executed, a material operation causes the DBMS to materialize a table or intermediate results of a query during execution. For example, a query execution plan may include a node representing a material operation when a table is repeatedly retrieved during query execution. Materialized tables or intermediate results from performing a material operation can be stored in-memory or on disk in a specified data structure, such as a data structure for storing tuples.

Materialized tables or intermediate results are accessed by the DBMS during a future join operation, for example, a parent to the material operation in the query execution plan. During materialization of the needed attributes, the DBMS accesses columnar cache indices of the data structure generated by executing the material operation. Using the indices, the DBMS retrieves the needed attributes from the columnar cache, before retrieving the remaining attributes.

This late materialization-aware material operation not only enables late materialization for a parent join operation, but also reduces the size of the data structure used to store the materialized table or intermediate results in the temporary memory.

FIG. 5D is a flowchart of an example process 500D for storing cache indices of needed attributes during late materialization of a material operation.

The DBMS receives a query execution plan having a node representing a material operation, according to block 510D.

The DBMS executes the material operation to generate a materialized table or intermediate results in a data structure in temporary memory and stores a columnar unit index and row index for each attribute in the data structure, according to block 520D.

The DBMS accesses stored columnar indices in the data structure while retrieving needed attributes for a join operation, according to block 530D.

After retrieving the needed attributes, the DBMS retrieves remaining attributes for executing the query represented by the query execution plan, according to block 540D.

Example Computing Environment

Figure 6:
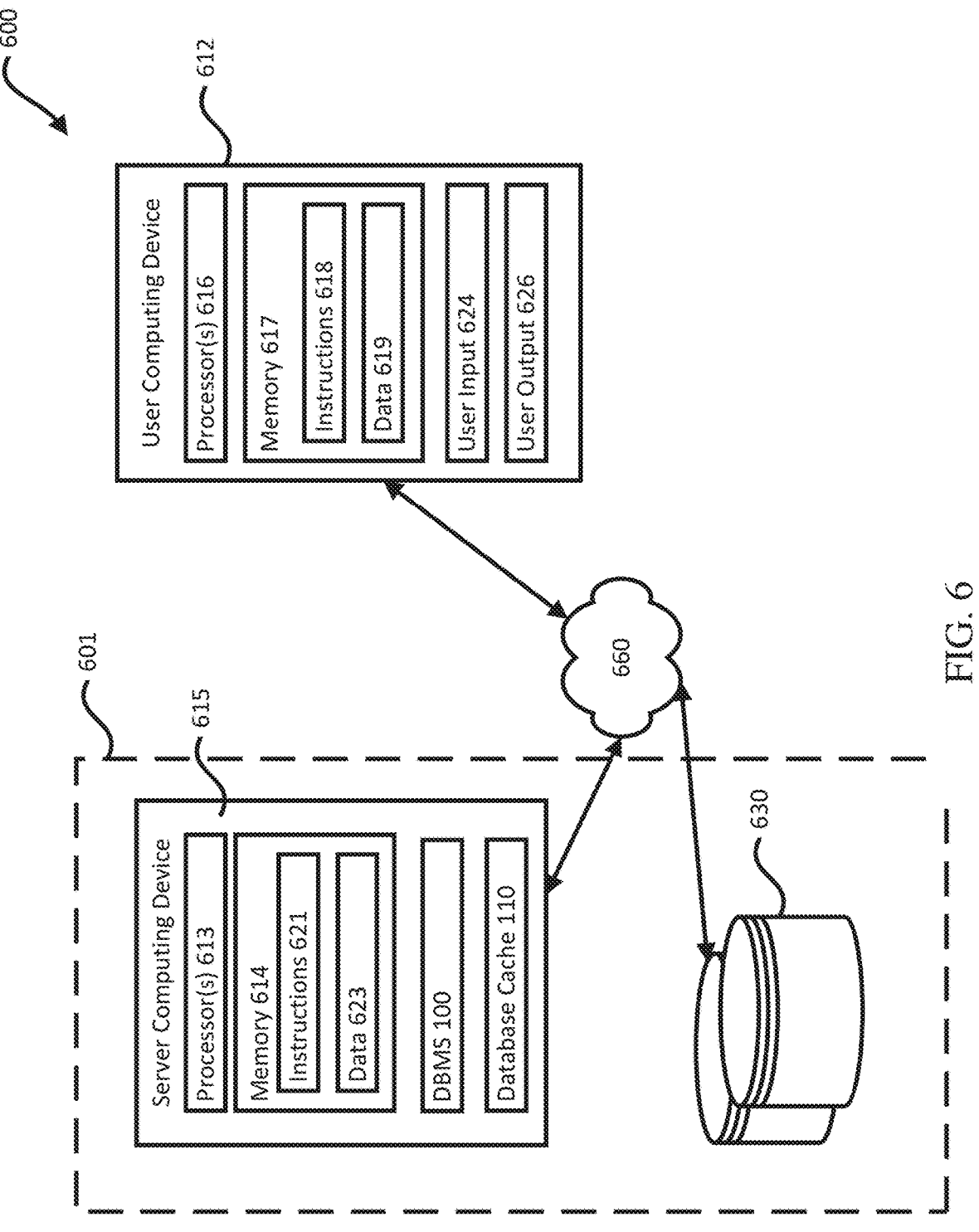
FIG. 6 is a block diagram of an example environment for implementing the DBMS.

FIG. 6 is a block diagram of an example environment 600 for implementing the DBMS 100. The DBMS 100 can be implemented on a device having one or more processors in one or more locations, such as in server computing device 615. User computing device 612 and the server computing device 615 can be communicatively coupled to one or more storage devices 630 over a network 660. The storage device(s) 630 can be a combination of volatile and non-volatile memory and can be at the same or different physical locations than the computing devices 612, 615. For example, the storage device(s) 630 can include any type of non-transitory computer readable medium capable of storing information, such as a hard-drive, solid state drive, tape drive, optical storage, memory card, ROM, RAM, DVD, CD-ROM, write-capable, and read-only memories. The storage device(s) 630 can store the databases managed by the DBMS 100.

The server computing device 615 can include one or more processors 613 and memory 614. The memory 614 can store information accessible by the processor(s) 613, including instructions 621 that can be executed by the processor(s) 613. The memory 614 can also include data 623 that can be retrieved, manipulated, or stored by the processor(s) 613. The memory 614 can be a type of non-transitory computer readable medium capable of storing information accessible by the processor(s) 613, such as volatile and non-volatile memory. The processor(s) 613 can include one or more central processing units (CPUs), graphic processing units (GPUs), field-programmable gate arrays (FPGAs), and/or application-specific integrated circuits (ASICs), such as tensor processing units (TPUs).

The server computing device 615 can also include the database cache 110 for caching data during query execution.

The instructions 621 can include one or more instructions that when executed by the processor(s) 613, causes the processors(s) 613 to perform actions defined by the instructions. The instructions 621 can be stored in object code format for direct processing by the processor(s) 613, or in other formats including interpretable scripts or collections of independent source code modules that are interpreted on demand or compiled in advance. The instructions 621 can include instructions for implementing the DBMS 100 consistent with aspects of this disclosure. The DBMS 100 can be executed using the processor(s) 613, and/or using other processors remotely located from the server computing device 615.

The data 623 can be retrieved, stored, or modified by the processor(s) 613 in accordance with the instructions 621. The data 623 can be stored in computer registers, in a relational or non-relational database as a table having a plurality of different fields and records, or as JSON, YAML, proto, XML documents, and/or any of a variety of other formats. The data 623 can also be formatted in a computer-readable format such as, but not limited to, binary values, ASCII or Unicode. Moreover, the data 623 can include information sufficient to identify relevant information, such as numbers, descriptive text, proprietary codes, pointers, references to data stored in other memories, including other network locations, or information that is used by a function to calculate relevant data.

The user computing device 612 can also be configured similar to the server computing device 615, with one or more processors 613, memory 617, instructions 618, and data 619. The user computing device 612 can also include a user output 626, and a user input 624. The user input 624 can include any appropriate mechanism or technique for receiving input from a user, such as keyboard, mouse, mechanical actuators, soft actuators, touchscreens, microphones, sensors, etc.

The server computing device 615 can be configured to transmit data to the user computing device 612, and the user computing device 612 can be configured to display at least a portion of the received data on a display implemented as part of the user output 626. The user output 626 can also be used for displaying an interface between the user computing device 612 and the server computing device 615. The user output 626 can alternatively or additionally include speakers, transducers or other audio outputs, a haptic interface or other tactile feedback that provides non-visual and non-audible information to the platform user of the user computing device 612.

Although FIG. 6 illustrates the processors 613, 615 and the memories 614, 617 as being within the computing devices 615, 612, components described in this specification, including the processors 613, 615 and the memories 614, 617 can include multiple processors and memories that can operate in different physical locations and not within the same computing device. For example, some of the instructions 621, 618 and the data 623, 619 can be stored on a removable SD card and others within a read-only computer chip. Some or all of the instructions and data can be stored in a location physically remote from, yet still accessible by, the processors 613, 615. Similarly, the processors 613, 615 can include a collection of processors that can perform concurrent and/or sequential operation. The computing devices 615, 612 can each include internal clocks providing timing information, which can be used for time measurement for operations and programs run by the computing devices 615, 612.

The server computing device 615 can be configured to receive requests to process data from the user computing device 612. For example, a computing platform 601 can include the server computing device 615 and the storage device(s) 630 and be configured to provide a variety of services to users, through various user interfaces and/or APIs exposing the platform services.

The devices 612, 615 can be capable of direct and indirect communication over the network 660. The devices 615, 612 can set up listening sockets that may accept an initiating connection for sending and receiving information. The network 660 itself can include various configurations and protocols including the Internet, World Wide Web, intranets, virtual private networks, wide area networks, local networks, and private networks using proprietary communication protocols. The network 660 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 660, in addition or alternatively, can also support wired connections between the devices 612, 615, including over various types of Ethernet connection.

Although a single server computing device 615 and user computing device 612 are shown in FIG. 6, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, for example, as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

With respect to the use of substantially any plural and/or singular terms herein, for example (with the term "element" being a stand-in for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated.

The invention claimed is:

1. A system comprising:

one or more processors configured to:

receive a query for data in a database comprising one or more tables, each table comprising one or more respective attributes, the query referencing a plurality of attributes;

determine a first execution step for executing the query, wherein the first execution step is associated with a first respective query operation of the received query execute the first respective query operation of the first execution step, wherein execution of the first respective query operation comprises:

determine, from the first execution step, one or more first attributes of the plurality of attributes needed for executing the first respective query operation of the first execution step;

retrieve the one or more first attributes from a database cache caching the plurality of attributes from the one or more tables; and execute the first execution step; and determine a second execution step for executing the query, wherein the second execution step is associated with a second respective query operation of the received query;

execute the second respective query operation of the second execution step, wherein execution of the second respective query operation comprises:

determine, from the second query execution step, one or more second attributes of the plurality of attributes that are different from the one or more first attributes and that are needed for executing the second respective query operation of the second execution step;

retrieve the one or more second attributes from the database cache; and execute the second execution step.

2. The system of claim 1, wherein in determining, for each respective query operation, respective one or more attributes needed for executing the respective query operation, the one or more processors are configured to:

determine the respective one or more attributes specified as operands or conditions in the received query for executing the respective query operation.

3. The system of claim 2, wherein the respective query operations comprise one or more join operations for joining two or more tables according to a join condition; and wherein in determining, for each respective query operation, the respective one or more attributes needed for executing the respective query operation, the one or more processors are configured to determine that the two or more tables according to the join condition are needed attributes for executing the join operation.

4. The system of claim 1, wherein the cache is a columnar cache configured to cache attributes in one or more columnar units, each columnar unit corresponding to a respective columnar unit index and comprising one or more respective rows, each row corresponding to a respective row index within the columnar unit, and wherein the one or more processors are further configured to:

store a respective columnar unit index and respective row index for each attribute referenced in the query;

retrieve the one or more needed attributes using the stored respective columnar unit index and respective row index for each needed attribute; and after retrieving the one or more needed attributes, retrieve remaining attributes referenced in the query using the stored respective columnar unit index and respective row index for each remaining attribute.

5. The system of claim 4, wherein in retrieving the remaining attributes, the one or more processors are configured to, for each execution step:

determine, for a current execution step, one or more attributes of the remaining attributes that are needed for executing the respective query operation during the current execution step;

retrieve the one or more attributes of the remaining attributes that are needed for executing the respective query operation during the current execution step; and then retrieve the remaining attributes that are not needed for executing the respective query operation during the current execution step.

6. The system of claim 1, wherein in retrieving respective one or more needed attributes for a respective query operation from the database cache, the one or more processors are further configured to retrieve the respective one or more needed attributes for the respective query operation only during the respective execution step of the respective query operation.

7. The system of claim 1, wherein in retrieving respective one or more needed attributes for a respective query operation from the cache, the one or more processors are further configured to:

scan the cache to retrieve only the respective one or more needed attributes for the respective query operation only executed by the one or more processors during a current execution step; and after executing the query operation during the current execution step, execute a next query operation during a next execution step following the current execution step, wherein in executing the next query operation, the one or more processors are configured to scan attributes of the cache to retrieve only one or more needed attributes for executing the next query operation.

8. The system of claim 1, wherein in determining, for each respective query operation, respective one or more attributes of the plurality of attributes needed for executing the respective query operation, the one or more processors are configured to:

generate a data structure representing attribute dependencies for each attribute referenced in the query, an attribute dependency for a first attribute comprising data representing zero or more child attributes that are respective result attributes of one or more query operations executed at respective earlier execution steps than an execution step for a query operation in which the first attribute is needed.

9. The system of claim 8, wherein the one or more processors are further configured to:

identify, from the data structure representing the attribute dependencies for each attribute, the zero or more child attributes for the first attribute; and retrieve the zero or more child attributes for the first attribute from the cache during an execution step in which the query operation needing the first attribute is executed.

10. A computer-implemented method, comprising:

receiving, by one or more processors, a query for data of a database comprising one or more tables, each table of the one or more tables comprising one or more respective attributes, the query referencing a plurality of attributes included in the one or more tables;

determining, by the one or more processors, a first execution step for executing the query, wherein the first execution step is associated with a first respective query operation of the received query;

executing, by the one or more processors, the first respective query operation of the first execution step, wherein execution of the first respective query operation comprises:

determining, from the first query execution step, one or more first attributes of the plurality of attributes needed for executing the first respective query operation of the first execution step;

retrieving the one or more first attributes from a database cache caching the plurality of attributes from the one or more tables; and executing the first execution step; and determining, by the one or more processors, a second execution step for executing the query, wherein the second execution step is associated with a second respective query operation of the received query;

executing, by the one or more processors, the second respective query operation of the second execution step, wherein execution of the second respective query operation comprises:

determining, from the second query execution step, one or more second attributes of the plurality of attributes that are different from the one or more first attributes and that are needed for executing the second respective query operation of the second execution step;

retrieving the one or more second attributes from the database cache; and executing the second execution step.

11. The method of claim 10, wherein determining, for each respective query operation, respective one or more attributes needed for executing the respective query operation comprises determining the respective one or more attributes specified as operands or conditions in the received query for executing the respective query operation.

12. The method of claim 10, wherein the cache is a columnar cache configured to cache attributes in one or more columnar units, each columnar unit corresponding to a respective columnar unit index and comprising one or more respective rows, each row corresponding to a respective row index within the columnar unit, and wherein the method further comprises:

storing, by the one or more processors, a respective columnar unit index and respective row index for each attribute referenced in the query;

retrieving, by the one or more processors, the one or more needed attributes using the stored respective columnar unit index and respective row index for each needed attribute; and after retrieving the one or more needed attributes, retrieving, by the one or more processors, remaining attributes referenced in the query using the stored respective columnar unit index and respective row index for each remaining attribute.

13. The method of claim 12, wherein retrieving the remaining attributes comprises, for each execution step:

determining, by the one or more processors and for a current execution step, one or more attributes of the remaining attributes that are needed for executing the respective query operation during the current execution step;

retrieving, by the one or more processors, the one or more attributes of the remaining attributes that are needed for executing the respective query operation during the current execution step; and then retrieving, by the one or more processors, the remaining attributes that are needed for executing the respective query operation during the current execution step.

14. The method of claim 10, wherein retrieving the respective one or more needed attributes for a respective query operation from the database cache comprises retrieving the respective one or more needed attributes for the respective query operation only during the respective execution step of the respective query execution operation.

15. The method of claim 10, wherein retrieving the respective one or more attributes comprises:

scanning, by the one or more processors, attributes of the cache to retrieve only the respective one or more needed attributes for the query; and after executing the query operation during a current execution step, executing a next query operation during a next execution step following the current execution step, comprising scanning attributes of the cache to retrieve only one or more needed attributes for executing the next query operation.

16. The method of claim 10, wherein determining, for each respective query operation, respective one or more attributes of the plurality of attributes needed for executing the respective query operation comprises:

generating, by the one or more processors, a data structure representing attribute dependencies for each attribute referenced in the query, an attribute dependency for a first attribute comprising data representing zero or more child attributes that are respective result attributes of one or more query operations executed at respective earlier execution steps than an execution step for a query operation in which the first attribute is needed.

17. The method of claim 16, wherein the method further comprises:

identifying, by the one or more processors and from the data structure representing the attribute dependencies for each attribute, the zero or more child attributes for the first attribute; and retrieving the zero or more child attributes for the first attribute from the cache during an execution step in which the query operation needing the first attribute is executed.

18. One or more non-transitory computer-readable storage media encoding instructions that when executed by one or more processors, cause the one or more processors to perform operations comprising:

receiving, by one or more processors, a query for data of a database comprising one or more tables, each table of the one or more tables comprising one or more respective attributes, the query referencing a plurality of attributes included in the one or more tables;

determining, by the one or more processors, a first execution step for executing the query, wherein the first execution step is associated with a first respective query operation of the received query;

executing, by the one or more processors, the first respective query operation of the first execution step, wherein execution of the first respective query operation comprises:

determining, from the first query execution step, one or more first attributes of the plurality of attributes needed for executing the first respective query operation of the first execution step;

retrieving the one or more first attributes from a database cache caching the plurality of attributes from the one or more tables; and executing the first execution step; and determining, by the one or more processors, a second execution step for executing the query, wherein the second execution step is associated with a second respective query operation of the received query;

executing, by the one or more processors, the second respective query operation of the second execution step, wherein execution of the second respective query operation comprises:

determining, from the second query execution step, one or more second attributes of the plurality of attributes that are different from the one or more first attributes and that are needed for executing the second respective query operation of the second execution step;

retrieving the one or more second attributes from the database cache; and executing the second execution step.

19. The non-transitory computer-readable storage media of claim 18, wherein determining, for each respective query operation, respective one or more attributes needed for executing the respective query operation comprises determining the respective one or more attributes specified as operands or conditions in the received query for executing the respective query operation.

20. The non-transitory computer-readable storage media of claim 18, wherein the cache is a columnar cache configured to cache attributes in one or more columnar units, each columnar unit corresponding to a respective columnar unit index and comprising one or more respective rows, each row corresponding to a respective row index within the columnar unit, and wherein the operations performed by the one or more processors in executing the encoded instructions of the one or more non-transitory computer-readable storage media further comprise: storing a respective columnar unit index and respective row index for each attribute referenced in the query;

retrieving the one or more needed attributes using the stored respective columnar unit index and respective row index for each needed attribute; and after retrieving the one or more needed attributes, retrieving remaining attributes referenced in the query using the stored respective columnar unit index and respective row index for each remaining attribute.

\* \* \* \* \*